3,493,383
LIQUID, HEAT-SETTING EDIBLE PRODUCT
John W. Ryan, Los Angeles, Albert L. Stone, Palos Verdes Peninsula, and Edward Thomas Martin III, Manhattan Beach, Calif., assignors to Mattel, Inc., Hawthorne, Calif., a corporation of California
No Drawing. Filed Jan. 13, 1967, Ser. No. 608,998
Int. Cl. A23g *3/00;* A23l *1/00, 1/04*
U.S. Cl. 99—1                                                    13 Claims

ABSTRACT OF THE DISCLOSURE

A liquid composition coagulable on heating to a solidified edible product, the composition including glycerine or a mixture of glycerine and propylene glycol, carrageenan as a binding agent to imbibe the liquid and form a semi-fluid mixture at a first predetermined temperature and a starch to effect solidification at at second, higher predetermined temperature.

CROSS REFERENCE TO RELATED APPLICATION

The products herein described may be employed in the method disclosed in copending application Ser. No. 608,-975, filed Jan. 13, 1967.

The widespread acceptance of a toy wherein molded, soft, pliable plastic articles may be made by a youngster using a liquid material which may be placed in a suitable mold and heated to a predetermined temperature is known. Once a child has accumulated a supply of such molded articles, he loses his interest in the toy. It was then realized that the child's interest in the toy could be maintained by making the finished article edible so that it would be consumed.

Thus, there appeared to be a need for a liquid, heat-setting edible product which a child could use. This liquid product should be storable at room temperatures, should be non-toxic both before and after processing, should be non-irritating to the skin, non-flammable, flavorable and should be storable for long periods without supporting harmful bacteria.

In addition, the material should be capable of picking up mold details to reproduce a reasonable facsimile of a mold and should be capable of turning from a liquid to a solid at predetermined molding temperatures. Also, the liquid material should be homogenous and flowable at room temperatures.

In view of the foregoing, it is a primary object of the present invention to provide a liquid, heat-setting edible product suitable for use by a child user in a hot mold.

Another object of the present invention is to provide a liquid product of the type described which has germicidal properties.

Another object of the present invention is to provide a liquid product of the type described which, upon the application of a predetermined amount of heat, will pick up mold details and solidify in a mold.

A further object of the present invention is to provide a liquid product of the type described which includes an edible liquid having a boiling point above its gel point and germicidal properties and a binding agent which will imbibe the liquid and solidify at a predetermined temperature.

According to the present invention, a liquid, heat-setting edible product is provided which includes an edible liquid having a boiling point above its gel point and germicidal properties, a first edible binding agent which imbibes the liquid to form a semi-fluid mixture at a predetermined temperature and a second edible binding agent capable of solidifying the semi-fluid mixture at a second, higher predetermined temperature.

Glycerine alone or in combination with propylene glycol has been found suitable to serve as the liquid and carrageenan is suitable for the first binding agent. Starches, such as corn starch and tapioca starch, have been found to be suitable for the second binding agent.

In addition, suitable sweeteners, flavoring materials, coloring materials, anti-gelling agents, internal mold-release agents and antioxidants may be used.

The features of the present invention which are believed to be novel are set forth with particularity in the appended claims. The present invention, both as to its composition and manner of use, together with further objects and advantages thereof, may best be understood by reference to the following description.

A liquid, heat-setting edible product of the present invention includes an edible liquid having a boiling point above its gel point and germicidal properties. A temperature of 220° F. is reached by the product during the molding thereof into a solid edible product. Thus, liquids having a boiling point below the material's gel point would bubble and be dangerous for a child to handle because a shallow, open-face mold is used. In addition, if the liquid boiled below its gel point, a faithful reproduction of the mold probably would not be obtained. It is important that the liquid have germicidal properties so that the product will have a long shelf life and so that the molded, solid product will not support harmful bacteria. 99½ U.S.P. glycerol, either alone or in combination with propylene glycol, has been found to be satisfactory.

A second ingredient in the product comprises a binding agent capable of for solidifying the liquid, heat-setting edible product at the molding temperatures employed. These molding temperatures range from about 195° F. to about 220° F. This binding agent should be capable of swelling and holding-in the liquid. Examples of such an agent are starches, such as corn starch and tapioca starch. When used, the propylene glycol acts as a viscosity reducer preventing the glycerine and starch from gelling at room temperatures. In addition, the propylene glycol vaporizes at molding temperatures to aid in the expulsion of liquid from the solid.

The liquid product should be a homogeneous product and remain a flowable liquid during long periods of storage. In addition, the molded solid product should be an elastic solid and should have sufficient strength to facilitate removal of the finished product from a mold. The liquid product may be given these characteristics by using another binding agent which imbibes for imbibing most of the liquid to form a semi-fluid mixture at a predetermined temperature. Carrageenan has been found to be capable of holding 98% of the glycerine. In addition, this product gives strength that the starch alone does not have. The carrageenan gels the glycerine at about 180° F. giving a semi-solid.

If desired, an internal mold release may be used in the liquid product to facilitate removing the finished product from the mold. It has been found that glycerol mono-oleate makes a suitable mold release.

If it is desirable to prevent the carrageenan from gelling with the glycerine at a temperature below about 130° F., a monovalent cation may be used in the liquid product. A potassium salt, such as potassium citrate, has been found to be satisfactory for this purpose.

It may also be desirable to sweeten the liquid product. This may be accomplished by adding a sweetener in the form of sodium saccharin or sodium cyclamate. If sugar is used as a sweetener, it inhibits the gelling of the liquid product.

Hard-candy flavorings having a high boiling point may also be added to the liquid product for giving it a particular flavor. An antioxidant may then be added to prevent the flavoring materials from becoming rancid during storage at room temperatures. In addition, the product may be colored with any food-drug and cosmetic certified edible color. Preferably, a lakolene type of dye is used so that it will not bleed out from the liquid product. The product should be heat coagulable from a fluid mass to an elastic solid at an oven temperature of from 250° F. to 400° F. The solidified food should be easily freed from a heated mold; it should be compatible with several attractive food colors and flavors; and it must be acceptable to food and drug authorities. The precooked product should have a shelf life of approximately two years and should be free of microbiological spoilage.

A few examples of such a product are as follows:

EXAMPLE 1

| | Percent |
|---|---|
| Carrageenan (by weight) | 2.5 |
| Glycerol-mono-oleate | 0.5 |
| Sodium cyclamate (by weight) | 0.4 |
| Potassium citrate (by weight) | 0.4 |
| Tapioca starch (by weight) | 22 |
| Glycerol—99½% anhydrous (by weight) | 53 |
| Propylene glycol (by weight) | 21.2 |

The above ingredients may be combined into a liquid, heat-coagulable edible product by adding the sodium cyclamate and the potassium citrate to the glycerol and heating the mixture to approximately 160° F. to dissolve the sodium cyclamate and the potassium citrate. The glycerol-mono-oleate and propylene glycol may then be added and the mixture thus formed cooled to approximately 80° F. This liquid mixture may then be added to the carageenan and the tapioca starch using high sheer mixing methods. Alternatively, the liquid may be cooled to approximately 110° F. and the carrageenan and tapioca starch added thereto using low sheer mixing techniques. Regardless of the mixing technique used, some of the starch, becomes swollen and imbibed during the storage period so that it will not settle to the bottom of the mixture. After the mixing step, suitable flavorings and coloring materials may be added.

EXAMPLE 2

| | Parts by weight |
|---|---|
| Modified tapioca starch | 100 |
| U.S.P. 99½% glycerine | 225 |
| U.S.P. propylene glycol | 75 |
| Carrageenan | 9 |
| Potassium citrate-mono hydrate | 5 |
| Lecithin | 3 |
| Glycerol mono-oleate | 3 |
| An artificial sweetener comprising a 10 to 1 mixture of sodium cyclamate and sodium saccharin | 1 |
| An extract of honey | 0.5 |
| An antioxidant comprising 20% by weight of butylated hydroxy-anisole, 6% by weight of propyl gallate, 4% by weight of citric acid and 70% by weight of propylene glycol | 0.2 |
| U.S.P. natural oil of anise flavoring | 2.0 |
| Carbon channel black paste coloring | 1.5 |

EXAMPLE 3

A product having the ingredients of Example 2 was prepared, except that 1.5 parts by weight of imitation, wild-cherry, hard-candy flavor was substituted for the oil of anise and 0.8 part by weight of Bakers maroon paste and 0.4 part by weight of Bakers red paste were substituted for the black paste.

EXAMPLE 4

A product having the ingredients of Example 2 was prepared, except that 1.4 parts by weight of U.S.P. natural-distilled oil of peppermint flavoring and 1.2 parts by weight of Bakers green paste coloring were substituted for the oil of anise and the black paste, respectively.

EXAMPLE 5

A product having the ingredients of Example 2 was prepared, except that 1.2 parts of oil of root beer imitation and 1.2 parts by weight of Bakers brown paste were substituted for the oil of anise and the black paste, respectively.

EXAMPLE 6

A product having the ingredients of Example 2 was prepared, except that 1.5 parts by weight of imitation butterscotch hard-candy flavor and 1.2 parts by weight of Bakers yellow paste were substituted for the oil of anise and the black paste, respectively.

In each of the Examples 2–6, inclusive, the ingredients may be mixed by the following steps:

(1) Dissolving potassium citrate and artificial sweetener in the 225 parts of glycerine by heating to 170° F. with constant stirring.

(2) Cooling the mixture of step 1 to 80° F.

(3) Adding the propylene glycol, glycerol-mono-oleate, lecithin, antioxidant, extract of honey, coloring and flavoring to the cooled mixture.

(4) Dry blending the 100 parts of starch with the carrageenan.

(5) Adding the solution of step 3 to the dry blended materials of step 4 with enough shear to avoid agglomeration.

EXAMPLE 7

| | Percent by weight |
|---|---|
| Carrageenan | 2.5 |
| Glycerol-mono-oleate | 0.5 |
| Potassium citrate | 1.0 |
| Glycerine (99.5% anhydrous) | 78.0 |
| Potato starch | 10.0 |
| Tapioca starch | 8.0 |

A liquid, heat-coagulable edible product may be made from these ingredients using the mixing techniques of Example 1.

The liquid products set forth in Examples 1–7 above may be heated in a mold to a temperature within the range of about 190° F.–230° F. to form an elastic solid.

The viscosity of the product will drop initially because the glycerine becomes thinner when heated. However, as the heat approaches 180° F., the carrageenan gels the glycerine causing the viscosity to increase. As the temperature increases, this gelled glycerine becomes semi-fluid. As the temperature approaches 200° F.–220° F. the starch solidifies. Upon cooling, the carrageenan re-gels at about 180° F. giving a true solid.

The carrageenan gives strength to the molded product which the starch alone does not have. Also, the carrageenan is a protective factor in that it becomes a solid at lower temperatures and won't pour out readily from the mold.

What is claimed is:

1. A liquid, substantially anhydrous, heat-coagulable edible product, comprising:

an edible liquid having germicidal properties selected from the group consisting of glycerine and a mixture of glycerine and propylene glycol;

carrageenan as an edible binding agent for imbibing said liquid, said carrageenan being present in an amount sufficient to form a semi-fluid mixture at a first predetermined temperature; and a starch as a second edible binding agent present in an amount sufficient to solidify said semi-fluid mixture at a second, higher predetermined temperature, whereby said product on heating passes through a first semi-fluid state and then attains a solidified state.

2. An edible product as stated in claim 1 wherein said liquid is said mixture of glycerine and propylene glycol.

3. A product as stated in claim 1 wherein said liquid is glycerine and constitutes 74.2% by weight of the product, said carrageenan constitutes 2.5% by weight of the product and said second binding agent is tapioca starch and constitutes 22% by weight of the product.

4. A product as stated in claim 1 including an internal lubricant constituting an internal mold release.

5. A product as stated in claim 1 including suitable sweetening, flavoring, antioxidant and anti-gelling agents.

6. A product as stated in claim 1 comprising approximately 225 parts by weight of U.S.P. 99½% glycerine and approximately 75 parts by weight of U.S.P. propylene glycol; 9 parts by weight of carrageenan and 100 parts by weight of a starch, said product including 5 parts by weight of potassium citrate; 3 parts by weight of lecithin; 3 parts by weight of glycerol mono-oleate; 1 part by weight of an artificial sweetener comprising a 10 to 1 mixture of sodium cyclamate and sodium saccharin; 0.5 part by weight of extract of honey; 0.2 part by weight of an antioxidant comprising 20% by weight of butylated hydroxyanisole, 6% by weight of propyl gallute, 4% by weight of citric acid and 70% by weight of propylene glycol; 1.2 to 2.0 parts by weight of a flavoring agent and 1.2 to 1.5 parts by weight of a coloring agent.

7. A product as stated in claim 2 wherein said liquid also includes propylene glycol.

8. A product as stated in claim 4 wherein said internal mold release comprises 0.5% by weight of glycerol-mono-oleate.

9. A product as stated in claim 6 wherein said flavoring agent comprises U.S.P. natural oil of anise and said coloring agent comprises carbon channel black paste.

10. A product as stated in claim 6 wherein said flavoring agent comprises imitation wild-cherry, hard-candy flavoring and said coloring agent comprises 0.8 part by weight of Bakers maroon paste and 0.4 part by weight of Bakers red paste.

11. A product as stated in claim 6 wherein said flavoring agent comprises U.S.P. natural-redistilled oil of peppermint and said coloring agent comprises Bakers green paste.

12. A product as stated in claim 6 wherein said flavoring agent comprises imitation oil of root beer and said coloring agent comprises Bakers brown paste.

13. A product as stated in claim 6 wherein said flavoring agent comprises imitation, hard-candy butterscotch flavor and said coloring agent comprises Bakers yellow paste.

References Cited

UNITED STATES PATENTS

| 2,726,960 | 12/1955 | Bolanowski | 99—139 XR |
| 2,864,706 | 12/1958 | Stoloff | 99—131 |
| 2,970,919 | 2/1961 | Laurelton | 99—134 |

OTHER REFERENCES

Leffivgwell et al.: "New Uses for Glycerine," Manuf. Conf., December 1938, pp. 18–20 and 38.

RAYMOND N. JONES, Primary Examiner

T. M. HUNTER, Assistant Examiner

U.S. Cl. X.R.

99—131, 134